United States Patent
Mencher et al.

(10) Patent No.: US 6,711,472 B2
(45) Date of Patent: Mar. 23, 2004

(54) METHOD AND DEVICE FOR CONTROLLING OPERATIONAL SEQUENCES, PARTICULARLY IN A VEHICLE

(75) Inventors: Bernhard Mencher, Schwieberdingen (DE); Hans-Peter Klose, Reutlingen (DE); Peter Baeuerle, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/969,109

(22) Filed: Oct. 1, 2001

(65) Prior Publication Data

US 2002/0111716 A1 Aug. 15, 2002

(30) Foreign Application Priority Data

Sep. 29, 2000 (DE) .......................... 100 48 780

(51) Int. Cl.$^7$ .............. G05D 1/00; G06F 7/00
(52) U.S. Cl. .............. 701/1; 701/33; 340/3.3; 340/3.32; 700/7; 702/189
(58) Field of Search ............... 701/1, 29, 33, 701/35, 31; 702/189; 700/1, 7, 11, 19, 20, 23; 710/100; 340/3.1, 3.2, 3.3, 3.31, 3.32, 825.2

(56) References Cited

U.S. PATENT DOCUMENTS

| | | | | |
|---|---|---|---|---|
| 4,736,367 A | * | 4/1988 | Wroblewski et al. | 340/3.51 |
| 5,383,116 A | * | 1/1995 | Lennartsson | 700/9 |
| 5,512,890 A | * | 4/1996 | Everson et al. | 340/870.13 |
| 5,999,867 A | * | 12/1999 | Rogers et al. | 701/29 |
| 6,013,108 A | * | 1/2000 | Karolys et al. | 702/189 |
| 6,338,010 B1 | * | 1/2002 | Sparks et al. | 701/1 |
| 6,430,634 B1 | * | 8/2002 | Mito | 710/100 |

FOREIGN PATENT DOCUMENTS

DE        39 27 967        2/1991

OTHER PUBLICATIONS

Heintz et al., *Einsatzmöglichkeiten und Zukunftschancen intelligenter Sensoren im Kraftfahrzeug [Use Possibilities and Future Chances of Intelligent Sensors in the Motor Vehicle]*, Bosch Technical Reports 1990, Issue 52, pp. 30–41.*

* cited by examiner

Primary Examiner—Jacques H. Louis-Jacques
(74) Attorney, Agent, or Firm—Kenyon & Kenyon

(57) ABSTRACT

A method and a device for controlling operational sequences, particularly in a vehicle, at least one sensor having a connection unit being connected via a bus system to at least one control unit for controlling the operational sequences, the control unit likewise having a connection unit, and sensor information being transmitted to the control unit, the control unit reading in and/or processing the sensor information at specifiable synchronization points, the synchronization points being ascertained independently of one another in the control unit and in the sensor by, in each case, a synchronization element in such a way with an allowance that the sensor information is available at the synchronization point for the control unit in a manner that it is able to be read in and/or processed.

16 Claims, 6 Drawing Sheets

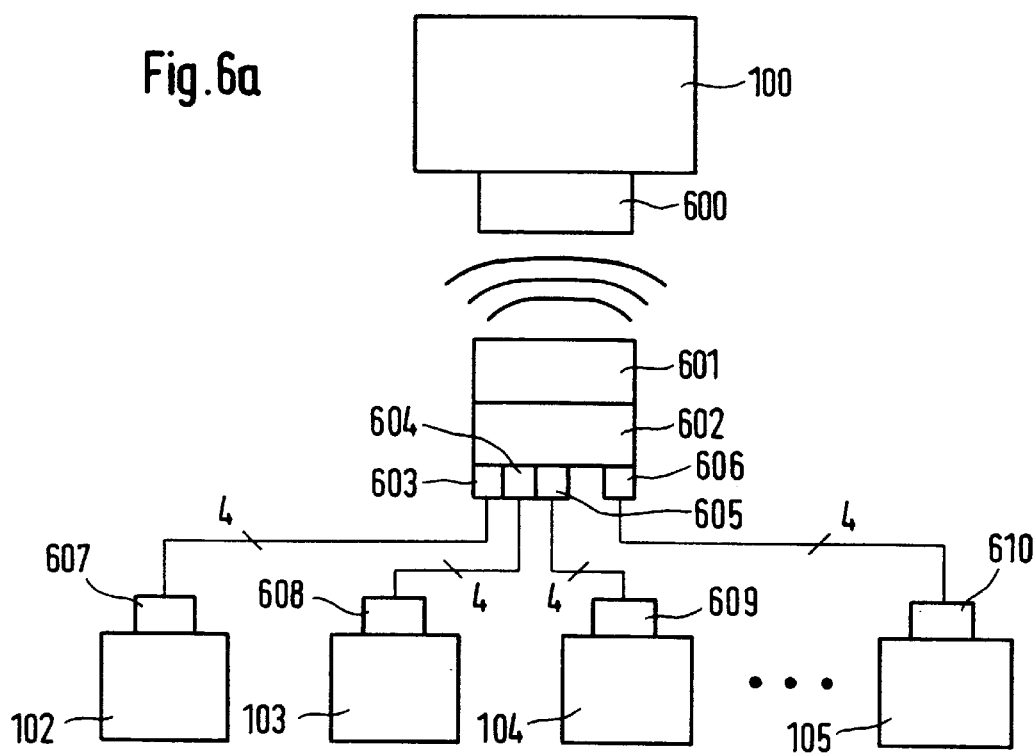
Fig.6a
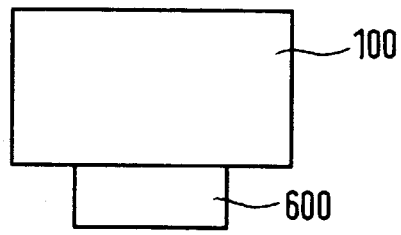
Fig.6b
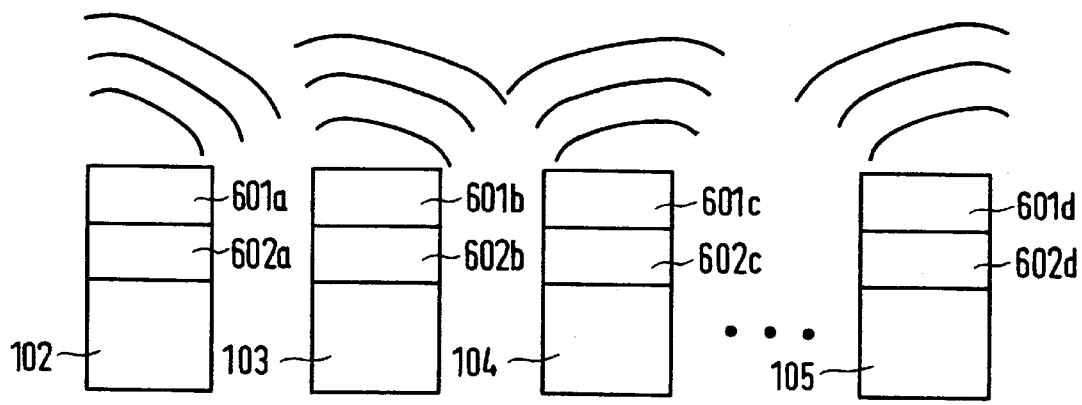

METHOD AND DEVICE FOR CONTROLLING OPERATIONAL SEQUENCES, PARTICULARLY IN A VEHICLE

FIELD OF THE INVENTION

The present invention relates to a method and a device for controlling operational sequences, particularly in a vehicle, at least one, sensor being connected to at least one control unit for controlling the operational sequences, and sensor information being transmitted to the control unit.

BACKGROUND INFORMATION

Today, vehicle sensors, particularly the sensors in the exhaust-gas branch, such as lambda sensors and hot-film air-mass meters, are frequently connected in a conventional manner via a cable harness to a control unit, particularly the engine control unit. Appropriate hardware lines are available for the signals and voltage supplies.

However, smart sensor technology having bus capability is indicated in the article by Heintz and Zabler "*Einsatzmöglichkeiten und Zukunftschancen intelligenter Sensoren im Kraftfahrzeug*" ("Use Possibilities and Future Chances of Intelligent Sensors in the Motor Vehicle") from the BOSCH Technical Reports 1990, issue 52, pp. 30 through 41, which corresponds to the German version of the lecture at the SAE Conference in Detroit in March 1989. In the vehicle concepts in that context, multiple measurements of quantities are carried out which are needed by electronic systems in the motor vehicle. By adding electronic components, the corresponding sensors are provided with signal preprocessing and are given bus capability, i.e. are made multiply utilizable. A bus concept thereby develops in which intelligent sensors having electronics locally are connected to at least one control unit.

In order to couple sensors to a control unit with the aid of a bus system, particularly a CAN bus system, diverse time conditions are observed, particularly in the case of real-time-critical applications, for example, for sensors of the exhaust branch in connection with the engine control unit.

As a basis for determining such time conditions, for example, the German Published Patent Application No. 39 27 967 describes an electronic counter having a counting circuit and a frequency divider connected in series to this counting circuit. This so-called angle clock has the feature that the adjustable frequency divider weights a preferably constant frequency, supplied to its first input, with a factor whose magnitude is freely specifiable by a cycle-speed signal able to be supplied at any time intervals to a second input of the frequency divider; and the factor determining the divider ratio continually maintains its instantaneous value until a change occurs due to the feeding of a cycle-speed signal deviating with respect to the previous cycle-speed signal.

SUMMARY OF THE INVENTION

An object of the present invention is, with the aid of a synchronization element, particularly such angle clocks known from the related art, to implement an optimal or optimized synchronization of the sensor suite with the control unit or control device.

The present invention is based on a method and a device for controlling operational sequences, particularly in a vehicle, at least one sensor having a connection unit being connected via a bus system to at least one control unit for controlling the operational sequences, the control unit likewise having a connection unit, and sensor information being transmitted to the control unit, the control unit reading in and/or processing the sensor information at specifiable synchronization points. The respective synchronization points are advantageously ascertained in the control unit and in the sensor independently of one another by, in each case, a synchronization element in such a way with an allowance that the sensor information is available at the synchronization point for the control unit in a manner that it is able to be read in and/or processed.

In this context, the respective synchronization element is advantageously designed as an electronic counter having a counting circuit and a frequency divider connected in series to it, in particular as an angle clock.

By the use of one synchronization element each, particularly an angle clock, in the control unit and in the at least one sensor, a time gain advantageously results with respect to the sensor information to be transmitted to the control unit, since the sensors are able to start and end measurements of their own accord because they can fall back upon a separate time base.

Thus, as basic prerequisite for the description of a sensor bus, particularly for the exhaust branch, a synchronization of sensors and control unit is expediently implemented such that the sensor information is transmitted to the control unit, i.e. is available at the control unit, just when the control unit should also read in and/or process the control information. This is achieved primarily in that the respective synchronization points are ascertained by the respective synchronization element in such a way with an allowance which takes into consideration transmission tolerances, processing tolerances and other time and angle conditions, such that the sensor information is available at the synchronization point for the control unit.

This coordination can prevent unnecessary and too many signals transmitted via the bus system, and thus a lower bus load can be attained.

In contrast to applications in which a pure software synchronization signal is used and in which a multitude of high-priority messages can delay the transmission of the pure software trigger, which means the demands on the transmission time are no longer fulfilled, the use of the respective synchronization element, particularly angle clocks, has the advantage that control unit and sensors can be synchronized with high reliability and without delay with respect to the demands on the transmission time, the high topicality of the sensor information relative to a software trigger signal nevertheless being ensured.

If the sensor expediently contains a processing unit which preprocesses the sensor information, the allowance is advantageously predefined and/or adapted corresponding to the time for preprocessing the sensor information.

In one advantageous refinement, the allowance can be predefined and/or adapted in a variable manner, as a function of at least one performance quantity stemming from at least one operational sequence, in particular as a function of the engine speed, the wheel speed or velocity, etc. Thus, the dynamic influence of specific performance quantities assignable to operational sequences, particularly the engine speed, is advantageously taken into consideration.

The synchronization element of the sensor advantageously transmits a first quantity for ascertaining the synchronization point to the control unit, and the control unit compares this quantity to a second quantity of the synchronization element of the control unit for ascertaining the synchronization point, a correction quantity being generated therefrom by which the synchronization element is synchronized.

The allowance is advantageously predefined and/or adapted as a function of at least one of the following influences:
- a transmission time from a processing unit of the control unit to its connection unit,
- a transmission time or waiting time up to the termination of a bus message already transmitted via the bus system, until the sensor information or the first quantity and/or the correction quantity can be transmitted,
- a transmission time of the first quantity and/or the correction quantity and/or the sensor information via the bus system,
- a transmission time from the connection unit of the sensor to its processing unit,
- a processing time until the end of the processing of the sensor information by the processing unit in the sensor and/or
- a transmission time of the sensor information and/or of the first quantity from the sensor to the control unit, which includes the transmission time from the processing unit to the connection unit of the sensor and the transmission time from the connection unit of the sensor via the bus system to the connection unit of the control unit, as well as the transmission time from the connection unit of the control unit to the processing unit of the control unit.

The allowance is advantageously determined either in the form of a time quantity as a time allowance or in the form of an angle quantity as an angle allowance. Accordingly, the first and second quantity, as well as the correction quantity can represent a time quantity or an angle quantity.

In this context, the time allowance and angle allowance can be converted into one another. This conversion of the time allowance into an angle allowance and vice versa, taking into account the angular velocity, has the advantage that the performance quantity, particularly the engine speed, is calculated only at the synchronization point, since the instantaneous angle, especially the crankshaft angle, is available, for example, at an engine control unit, and therefore the synchronization point can be determined as a function of this angle information.

By using individual synchronization elements in the sensor and the control unit, an additional, cost-intensive hardware trigger line between the control unit and sensor can expediently be avoided.

In one advantageous refinement, the sensor information and the quantities for ascertaining the correction signal, as well as the correction quantity itself, are transmitted in a line-less manner between the connection unit of the at least one sensor and the connection unit of the control unit; in this advantageous refinement, the connection units are designed as transmitter/receiver units of a line-less bus system, particularly a radio bus system. This advantageously permits even greater savings on line links.

BRIEF DESCRIPTION OF THE DRAWINGS

FIG. 6a shows a first embodiment of the arrangement according to the present invention when working with line-less signal or information transmission between control unit and sensor suite.

FIG. 6b shows a second embodiment of the arrangement according to the present invention when working with line-less signal or information transmission between control unit and sensor suite.

DETAILED DESCRIPTION

Figure 1:
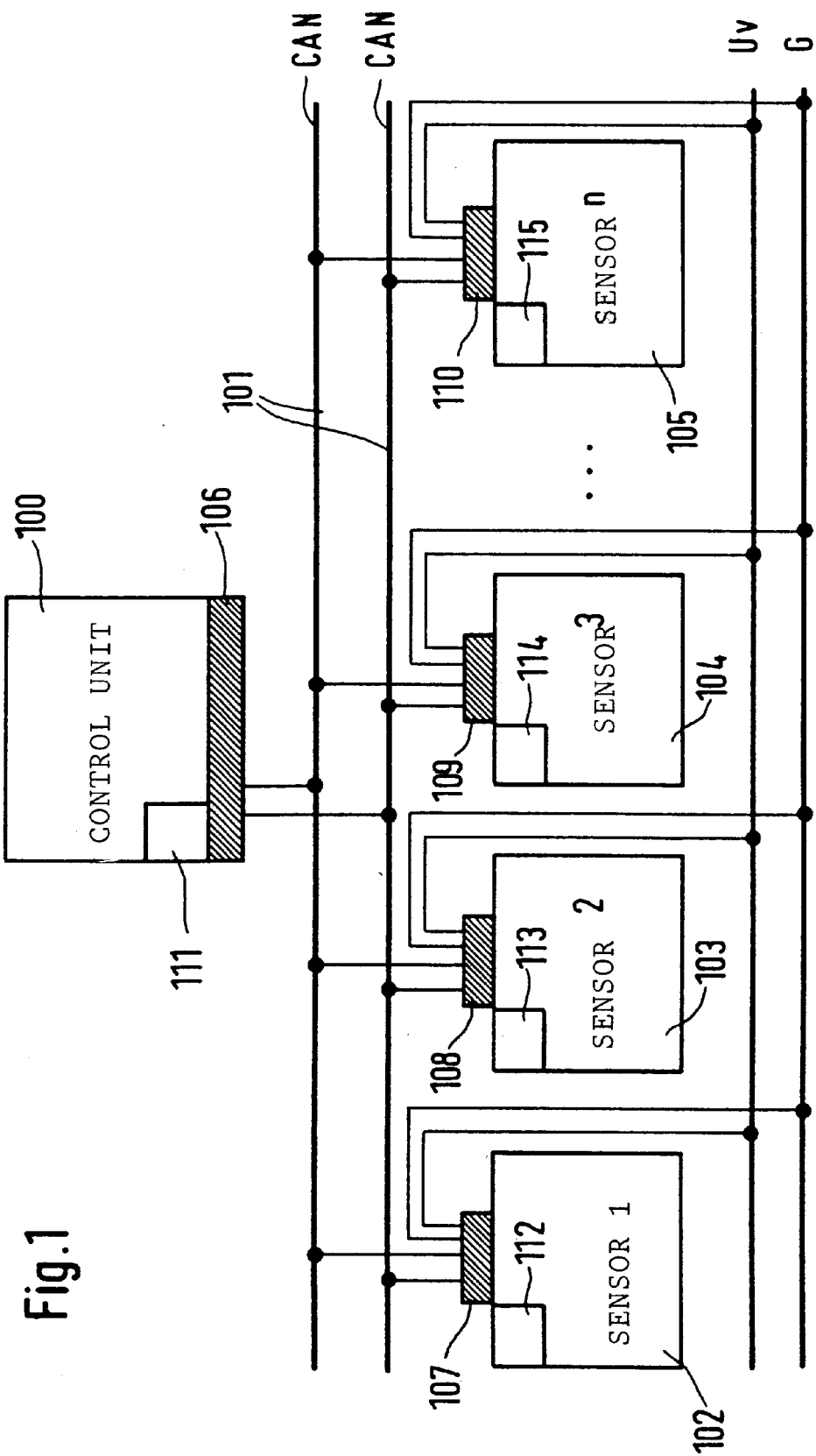
FIG. 1 shows a sensor bus system having sensors 1 through n and a control device, i.e. a control unit, which are connected by a line-conducted bus system, the control unit and the sensors each containing a synchronization element.

FIG. 1 shows a sensor bus arrangement having a control unit 100, particularly an engine control unit, and a bus system 101, particularly a CAN bus. The two lines shown within the framework of bus system 101 are used to represent the high information and low information, respectively, within the context of a digital data transmission. The control unit is connected to bus system 101 via connection unit 106. In the same way, sensors 102 through 105 are connected to bus system 101 by connection units 107 through 110, respectively. In this context, sensor I is, for example, a first lambda sensor, and sensor 2 is a second lambda sensor within the framework of a cylinder-selective lambda control; the lambda values for each segment are evaluated separately specific to the crankshaft angle, and are to be routed to the engine management within the next segment at the latest.

For example, sensor 3 is a hot-film air-mass meter HFM whose load signal is available in time at the engine control unit in a manner that it is readable and/or capable of being processed at the synchronization point, thus a specifiable point of time or angle, particularly crankshaft angle, at which the calculation of ignition and/or injection is started for each power cycle, in order to in fact be able to determine ignition and/or the injection for each cylinder.

A further optional sensor suite is shown by way of example with sensor n, 105, which, for example, represents an NOx sensor suite.

Sensor suite 102 through 105 is furthermore connected to supply voltage Uv and to ground G. The requests for transmission of the HFM signal and the segment information for the cylinder-selective lambda control are to be routed by way of the software trigger signal from the engine control unit to the respective sensors. In this context, the angle or the time duration between two synchronization points is represented with segment. One segment within the framework of the crankshaft angle is computed from 720° divided by the cylinder number.

The cylinder-selective lambda control and the ascertainment of the load signal with the aid of the hot-film air-mass meter are implemented over one segment, for example, in the engine management. In order, in so doing, to avoid a critical capacity utilization of bus system 101, particularly a CAN bus, the sensor information can already be pre-evaluated or pre-processed locally, thus, in a processing unit in the sensor. This preprocessing, e.g. an averaging and the associated transmission of the sensor information, particularly the average value, are then carried out in time so that, for example, the injection and/or the ignition for the next power cycle can be calculated at the synchronization point.

111 through 115 represent synchronization elements, particularly angle clocks. These synchronization elements can be implemented in software, on one hand, as well as in hardware. As a special exemplary embodiment, the term angle clock is now subsequently used for synchronization elements 111 through 115.

For example, if the demands on the transmission time of a synchronization message can no longer be fulfilled software-wise, an angle clock is used. In fact, in the control of operational sequences in connection with the crankshaft, as, for example, in the framework of a sensor bus for the exhaust branch, an angle clock simulates a virtual crankshaft in the corresponding sensors; that is to say, at given crankshaft angles (for example, at synchronization points), the sensors are able to start and end measurements of their own accord. In the same way, fixed allowances, particularly time and/or angle allowances, can be implemented specific, for example, to a synchronization point, in that in each case at the instantaneous synchronization point of time or synchronization angle point, the time allowance for the next synchronization point is converted into an angle allowance. According to the present invention, in so doing, speed dynamics influences are taken into account.

The angle clock exhibits the following advantages:

Smaller deviation of virtual and actual crankshaft angle, which means the synchronization points can be determined in the sensors themselves specific to previously defined crankshaft angles.

Cost savings with respect to an additional hardware trigger line, since an angle clock implemented in this manner, accompanied by a corresponding accuracy, can replace a hardware trigger line.

Higher accuracy than, for example, triggering carried out using software, since in the case of a software trigger signal, high-priority messages can delay the transmission, that is to say, a delayed arrival of the software trigger signal is possible. In comparison, the angle clock already allows for the time-delayed transmission of angle and speed information for the adjustment of the angle clock.

Figure 2:
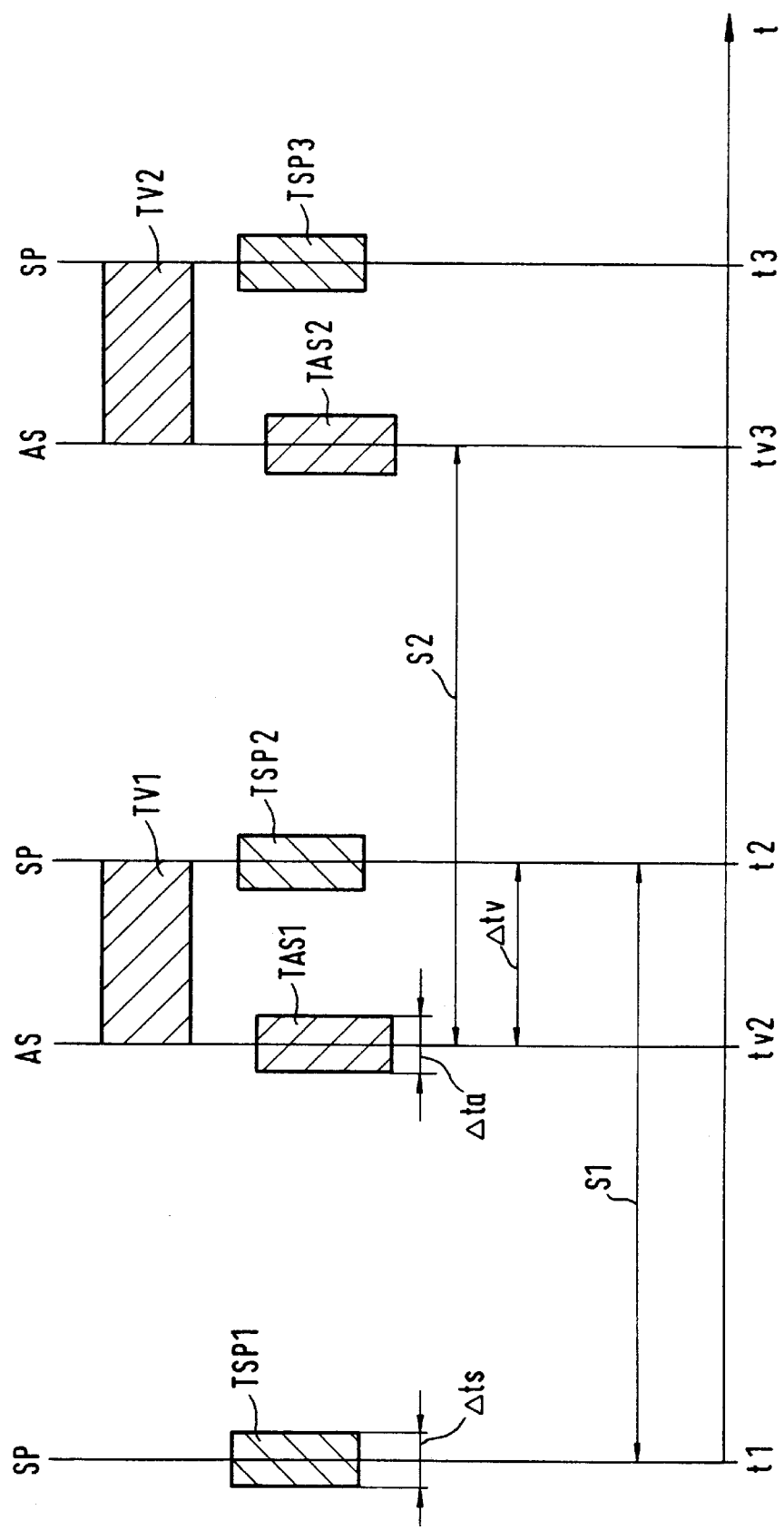
FIG. 2 shows a timing diagram with respect to the information exchange between control unit, particularly an engine control unit, and sensor, particularly a lambda sensor suite and/or a hot-film air-mass meter with time tolerances, particularly within the framework of an exhaust branch, and the allowance resulting therefrom.

The information and signal transmission is shown in FIG. 2 within the framework of a sensor bus, with consideration of tolerances occurring in this context. By way of example, the situation in FIG. 2 is explained in terms of a cylinder-selective lambda control and a hot-film air-mass meter within the framework of a sensor bus in the exhaust branch.

For a cylinder-selective lambda control, the lambda measured values should be allocated to the respective segment, here S1, that is to say, the starting and end point of the measuring window is defined by synchronization points t1 and t2, or t2 and t3 for the next segment.

The following variants are possible by way of example for ascertaining the lambda values,:

Two lambda values are measured per segment, these values being transmitted without evaluation to the control unit, particularly the engine control unit. On the other hand, the lambda values can be ascertained in a fixed time grid, for example, a millisecond, or by the existing angle clock at specific pre-definable angle points. When using intelligent or "smart" sensor suites, thus, sensor suites which contain a processing unit, preprocessing or a preliminary evaluation, e.g. averaging, can be carried out locally in the sensor.

These pre-processed lambda values, e.g. average values, are then transmitted, particularly within the framework of a physical interface, via the bus system to the control unit. The physical interface has the advantage that, particularly within the context of the line-less transmissions yet to be presented later, sensors can easily be added, taken from the interconnection or exchanged. In turn, variants are conceivable in processing the lambda values or average values, for example, averaging the measured lambda values within the first segment half of the respective segment, and/or averagings of the measured lambda values within the second segment half. These two average values, separately for the first and second segment half, can then be transmitted to the control unit.

Thus, FIG. 2 shows the demands on the synchronization. At synchronization points SP, thus t1, t2 and t3, a synchronization information is available with a corresponding tolerance $\Delta$ts, for example, for the continuous lambda probe LSU. Synchronization points SP characterize the starting point of time and the ending point of time of the segments, here S1, over which a cylinder-selective lambda control is carried out for each individual cylinder.

A specific tolerance window TSP1, TSP2 and TSP3, respectively, of the size $\Delta$ts exists with respect to the synchronization points. These predefined tolerances, caused by transmission-, processing- and/or waiting times, are to be honored by the angle clock.

With regard to the request for the transmission of the HFM signal (HFM: hot-film air-mass meter), a corresponding, here a time allowance, is taken into account, so that the HFM signal transmitted to the control unit is available in time at the synchronization point in the memory of the control unit. Point of time tv2 is ascertained in the sensor by converting the time allowance into an angle allowance at point of time t1, that is to say, the request for the transmission of the HFM signal is triggered at an angle value Kwwv2. Angle value Kwwv2 is ascertained according to the speed information at point of time t1, that is, divergences of the time allowance can result in response to speed dynamics (tolerance for the request of the HFM signal TAS1).

Thus, the allowance according to the present invention, particularly a time allowance or an angle allowance, is now provided in order to already have the sensor information available for the control unit at the respective synchronization point, particularly t2 and t3, in a manner that it is able to be read in and processed. Using hot-film air-mass meter HFM as an example, an allowance $\Delta$tv=t2−tv2 is therefore provided, by which transmission-, waiting- and/or processing times are taken into account in order to already have the load signal available at the synchronization point, for example, in t2 or t3.

These times result from transmissions, like first of all the request for the sensor transmission AS, transmitted from the control unit to the sensor, for example, via CAN, or from the ending of the preliminary evaluation or pre-processing of the sensor information in the sensor, e.g. the averaging of the measured values from the last segment, as well as the return transmission of the pre-evaluated sensor signals to the control unit, particularly the engine control unit. In this context, for the request of the data transmission of hot-film air-mass meter AS, a tolerance $\Delta$ta is provided which yields tolerance window TAS1 and TAS2, respectively.

For their part, the aforesaid transmission times and processing times, respectively, are themselves strongly tolerance-encumbered. Taking into account allowance time windows TV1 and TV2, thus t2−tv2 and t3−tv3, the start and end points of the segment, here S2, quasi shift in the comparison of t2 and t3 to the earlier allowance points of time tv2 and tv3. This segment for the hot-film air-mass meter, shown by way of example, thus lies between tv2 and tv3, that is, the synchronization signals are generated at these points of time by the angle clocks in the sensors so that the sensor information is then available at the synchronization point of time in the control unit. Pre-definable time allowance Δtv, e.g. TV1 and TV2, respectively, is then provided in such a way that the return transmission of the sensor information, particularly the preprocessing sensor information, can take place within time windows TV1 and TV2, respectively. Thus, the most up-to-date sensor information is available at the control unit at actual synchronization point t2 and t3 in a manner that it is able to be read in and processed, so that the calculations only have to be carried out in a synchronized manner one time, and thus it is already possible to save on computing power at this point.

In one advantageous development, the dynamic influence of certain performance quantities, particularly the engine speed, thus the dynamics of the engine, is taken into account for the selection of the allowance, particularly as angle allowance or time allowance TV1 and TV2, respectively. For example, this is the case when the engine speed increases with maximum load or when the engine speed decreases sharply.

In this context, points of time tv2 and tv3 are to be depicted, for example, on the angle plane, which will be clarified later.

Thus, the dynamic influence on the segment time for a positive engine-speed gradient is to be taken into account to the effect that, particularly in the case of low engine speeds, a noticeable reduction of the original segment time is to be determined, thus the segment time without dynamic influence in contrast to the segment time as a result of speed dynamics. In order to counteract this decrease of the effective allowance in the case of high positive speed dynamics and given low engine speeds, corresponding to FIG. 3, according to the present invention, the allowance is changed as a function of the dynamic performance quantity, particularly the engine speed. This allowance, particularly the allowance time, can likewise be changed upon exceeding an engine-speed dynamics, e.g. a threshold value.

Figure 3:
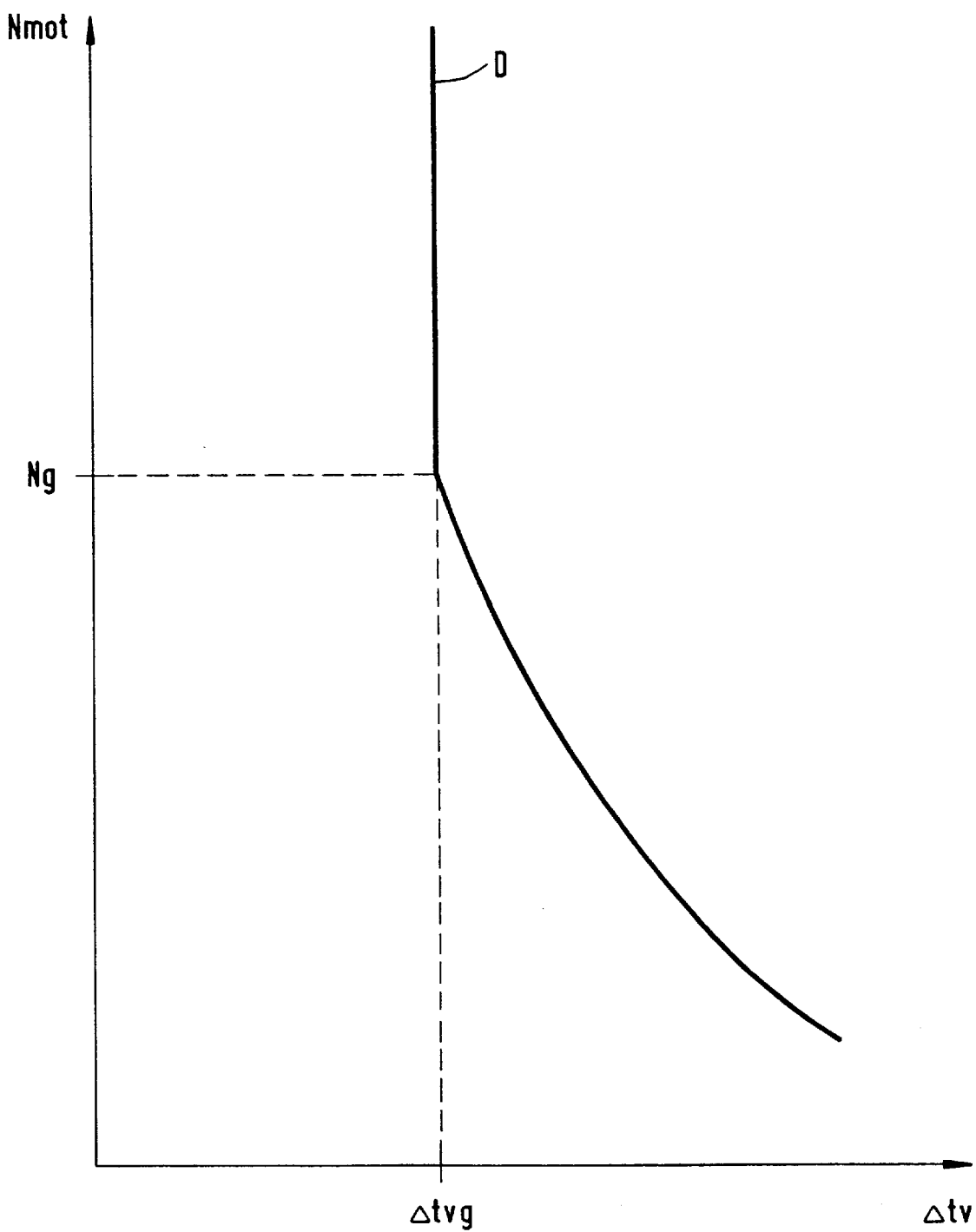
FIG. 3 shows the dynamic influence of the engine-speed performance quantity on the time allowance.

To that end, FIG. 3 shows engine speed Nmot over allowance time duration Δtv within the framework of a dynamics curve D. In this context, a limit time allowance Δtvg is taken into account. Within the framework of the previous tolerance considerations, allowance durations which are less than Δtvg may possibly no longer ensure the topicality of the sensor information at the respective synchronization point.

This limit time allowance corresponds to a limit speed Ng. At speeds greater than limit speed Ng, the time allowance is held constant at Δtvg for the aforesaid reasons. At speeds less than limit speed Ng, the allowance, i.e. allowance time Δtv can be adjusted in order to counteract the decrease in the effective allowance time in the case of low engine speeds, thus small period time duration.

Figure 4:
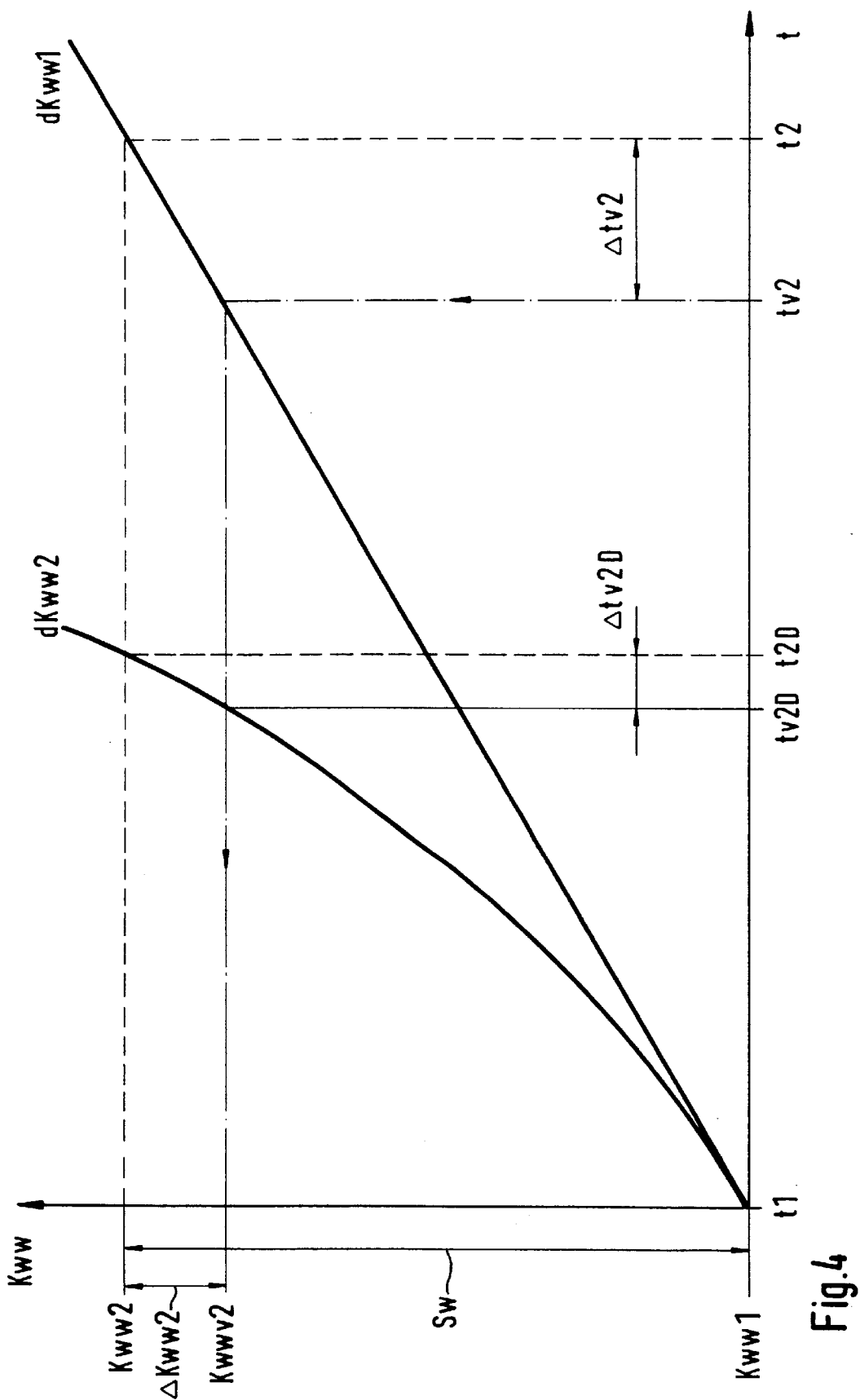
FIG. 4 shows the conversion between a time allowance and an angle allowance, taking into account the dynamic influences.

To take into account the dynamic influence and for imaging allowance points tv2 and tv3 on the angle plane, FIG. 4 shows a comparison of the crank angle profiles (Kww over t) for constant engine speeds dKww1 and for the acceleration of the engine dKww2. In view of the speed dynamics, synchronization point t2 shifts to dynamics point t2D to the left. In this context, it is taken into account that original point of time tv2 with allowance for the request for transmission of the sensor message, i.e. sensor information, thus request signal AS, lies to the right of t2D, therefore that given the presence of an engine-speed dynamics, the sensor message is first requested when present synchronization point t2D has already occurred. The request signal is meaningful insofar as, on one hand, an unbroken, very exact agreement of all angle clocks is very expensive to implement, and secondly, information can also be requested outside of fixed rasters.

If time allowance Δtv2 is converted at point of time t1 into an angle allowance ΔKww2, taking into account the angular velocity at t1, then upon reaching crankshaft angle Kwwv2, within the framework of the allowance, the transmission request can be started at point of time tv2D, thus the allowance point of time, taking into consideration the dynamics. In this way, the request for transmission of the sensor message always takes place chronologically prior to reaching the synchronization point. In this case, therefore, by the time duration Δtv2D prior to synchronization point t2D. In FIG. 4, t1 corresponds to crankshaft angle Kww1. The segment observed here in FIG. 4, transferred to the crankshaft angle, thus segment Sw, therefore reaches from Kww1 to Kww2.

The transfer to the angle, particularly the crankshaft angle, now yields the advantage that the performance quantity, here the engine speed, only has to be calculated at the synchronization point. The reason for this is that the instantaneous crankshaft angle is present in the engine control unit in any case, that is, upon reaching angle Kwwv2, the request for transmission of the sensor message can be effected to the sensor. Due to this restriction of the engine speed calculation to the synchronization points, considerable computing power and computing time can be saved in the engine control unit.

As a result of the speed dynamics, time allowance Δtv2 decreases to time allowance Δtv2D, thus the time allowance under dynamic influence. The transmission times according to the explanations for FIG. 2 likewise lie within the new allowance time Δtv2D. In FIG. 4, dKwwl represents the function for changing the crankshaft angle at constant engine speed, and dKww2 represents the function for changing the crankshaft angle, given acceleration of the engine.

Figure 5:
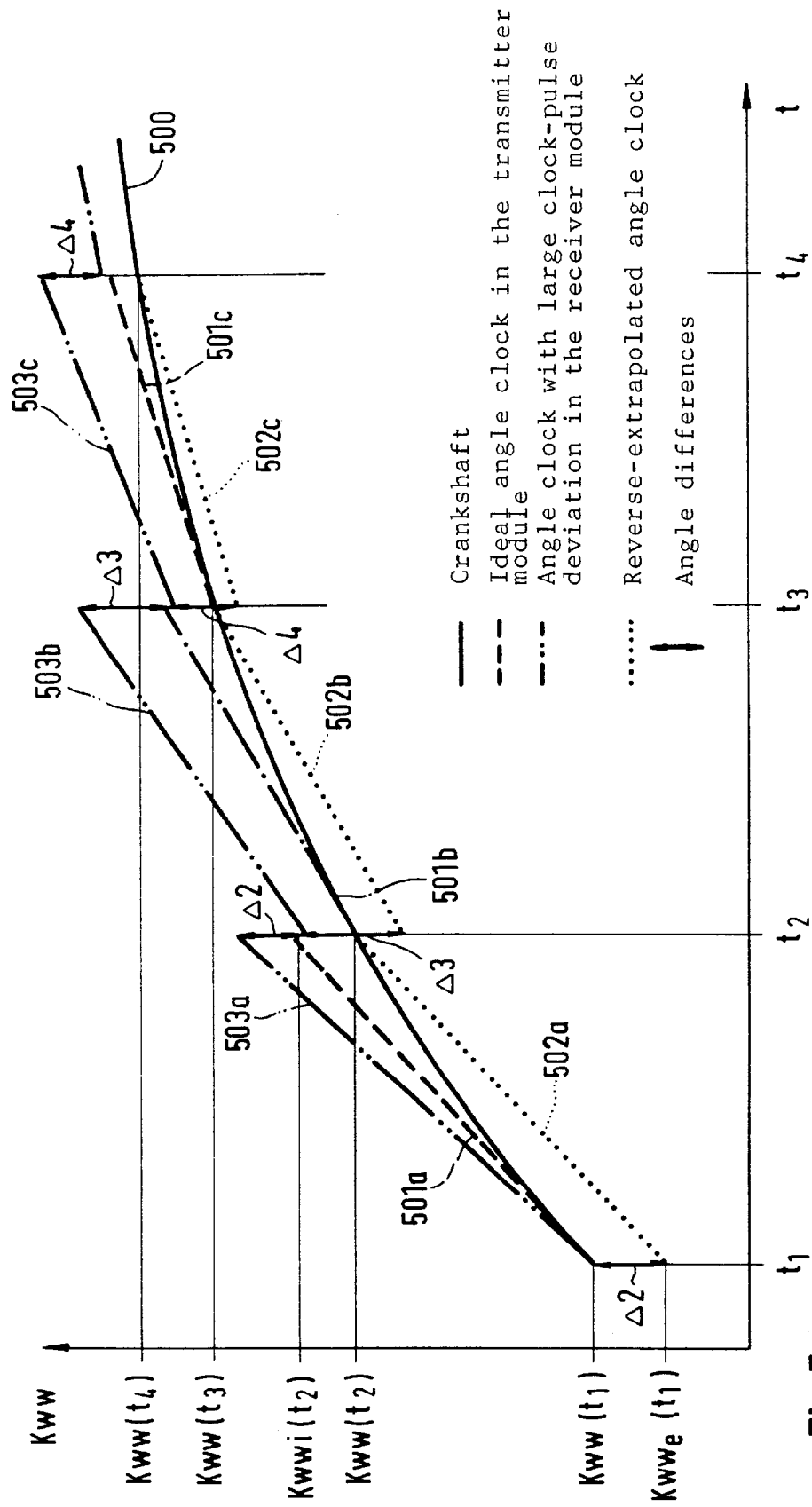
FIG. 5 shows a possible sequence for implementing the angle clock in terms of the entire sensor bus system, an angle clock being contained as a synchronization element in the sensor and the control unit, respectively.

FIG. 5 shows a possible sequence for implementing the angle clock. This sequence is based on the fact that each receiver module, that is to say, each sensor has its own angle clock; the transmitter module, thus the control unit, likewise has an ideal angle clock. Solid black line 500 represents the angle profile of the actual crankshaft. Broken line 501a, 501b, 501c in each case shows the profile of the ideal angle clock in the control unit. At point of time t1, the angles of the real crankshaft and of the ideal angle clock are identical corresponding to Kww (t1). Based on the speed information, at point of time t1 the angle of the ideal angle clock increases up until point of time t2 to Kwwi (t2), which corresponds to the section of the tangent to curve 500 in t1 with point of time t2. If this tangent 501a is shifted again at point of time t2 to the actual crankshaft angle corresponding to curve profile 500, which is represented by dotted line 502a, then, relative to point of time t1, a crankshaft deviation Δ2 results corresponding to Kww (t1)−Kwwe (t1), which corresponds to the reverse-extrapolated value of the angle clock. Both angle clocks, thus, the ideal angle clock in the control unit and the angle clock in the sensor (shown by profiles 503a, 503b, 503c) are corrected by this angle corresponding to Δ2.

For example, because of different quartz frequencies or quality, the actual angle clock and the ideal angle clock can deviate from one another, which is why such a correction is then performed. Thus, at points of time t2, t3, t4, etc., always by shifting the respective tangents 501b, 501c, etc. corresponding to 502b, 502c, etc., correction angles as correction quantities and in each case the instantaneous crankshaft rotational speed corresponding to the respective tangent gradient are transmitted in an adjustment message.

In order to take into account a time-delayed transmission of the adjustment messages for adjusting the angle clock (for example, when higher-priority CAN messages are being transmitted), the ideal angle clock is first adjusted when the receiver module, thus, the sensor, has received the adjustment message, for example, by acknowledge of the CAN message. At defined time intervals, the receiver module then sends its angle position, specific to these acknowledge points of time, back to the transmitter module, thus, the control unit, that is, the control unit can ascertain the clock-pulse deviations of the ideal angle clock and the sensor angle clock. At point of time t3, the receiver module, thus, the sensor, receives an angle correction value Δ3 which contains both the deviation of the ideal angle clock at point of time t3, as well as the deviation of the ideal angle clock and the sensor angle clock at point of time t2.

In one advantageous refinement of the present invention, a line-less connection is provided between sensors and the control unit, particularly within the context of a radio-bus system. Therefore, within the scope of the present invention, using bus systems, a transmission of a bidirectional type is provided between at least two users which follows fixed rules, thus, a bus protocol. To be understood by bus system is the line-conducted, just as the line-less transmission according to the present invention. For example, a line-less bus transmission can be advantageous at a region which is inconvenient for line installation, such as in the exhaust branch. Therefore, additional line links, e.g. a line-encumbered bus system as well, are omitted, which also means weight and costs can be saved. In addition, this also permits an even more flexible retrofitting of sensors compared to a physical interface of a line-conducted bus system.

To that end, FIG. 6, composed of FIG. 6a and 6b shows, by way of example, two selected possibilities for the sensor/control unit coupling, as here a line-less bus system, e.g. as a radio bus, or also in the infrared range depending on the wavelength or frequency of the electromagnetic wave. In FIG. 6a, sensors 1 through n, thus 102 through 105, e.g. a lambda sensor suite, an HFM or NOX sensor, are connected to a central evaluation electronics 602 via connection units 607 through 610 on the sensor side and connection units 603 through 606 on the evaluation-electronics side. A transmit-and-receive module 601 is allocated to this evaluation electronics 602. Such a transmit-and-receive module 600 is likewise installed at the control unit, particularly in engine control unit 100. Consequently, a line-less data transmission is possible between central electronics, thus evaluation electronics 602 on the sensor side and control unit 100.

In this example, sensors 102 through 105 are connected to the evaluation electronics in a conventional manner, e.g. via a group of lines having four lines. As presented before, instead a bus system here can equally couple the sensors to the evaluation electronics and the transmit/receive part in a line-conducted or line-less manner. The line-less data transmission can be a radio transmission, an optical transmission or any other line-less data transmission of any wavelength or frequency. Transmit-and-receive module 600 on the control-unit side can be mounted directly on or accommodated in the control unit. However, a line link between the control unit and transmit/receive module 600 is equally conceivable. The sensor signals measured in sensors 1 through n, 102 through 105, are preprocessed and evaluated at central evaluation electronics 602 shown here. Within the scope of the present invention, the central electronics can be used, for example, for evaluating the sensors of the exhaust branch.

In FIG. 6b, all sensors 1 through n, thus 102 through 105, are provided locally with a separate evaluation electronics 602a, 602b, 602c and 602d, respectively, including a transmit/receive module 601a, 601b, 601c and 601d. The evaluation electronics and the transmitter/receiver locally offer the advantages of a sensor adjustment, e.g. at the upper band limit, and a diagnosis locally. In this context, the transmitters can be differentiated, possibly on the basis of different frequencies or otherwise, in order to avoid collisions in the transmit and receive operation of the individual sensors and of the control unit. An appropriate bus protocol can achieve the same. The elements for the line-less data transmission described then fall back on the previously presented synchronization mechanism.

What is claimed is:

1. A method for controlling an operational sequence, in which at least one sensor includes a first connection unit that is connected via a bus system to at least one control unit for controlling the operational sequence, and the at least one control unit including a second connection unit, the method comprising the steps of:

transmitting sensor information to the at least one control unit;

causing the at least one control unit to at least one of read in and process the sensor information at specifiable synchronization points; and ascertaining the specifiable synchronization points independently of one another in the at least one control unit by a first respective synchronization element and in the at least one sensor by a second respective synchronization element in such a way with an allowance that the sensor information is available at the one of the specifiable synchronization points for the at least one control unit in a manner that the sensor information is able to be at least one of read in and processed, the first respective synchronization element being a separate element than the second respective synchronization element.

2. The method according to claim 1, wherein:

the operational sequence is controlled in a vehicle.

3. The method according to claim 1, wherein:

each synchronization element includes an angle clock that includes:

an electronic counter, a counting circuit connected in series to the counting circuit, and a frequency divider connected in series to the counting circuit.

4. The method according to claim 1, further comprising the steps of:

causing the synchronization element of the at least one sensor to transmit a first quantity for ascertaining the one of the specifiable synchronization points to the at least one control unit;

causing the at least one control unit to compare the first quantity to a second quantity of the synchronization element of the at least one control unit for ascertaining the one of the specifiable synchronization points and to generate a correction quantity therefrom; and synchronizing at least one of the synchronization element of the at least one sensor and the synchronization element of the at least one control unit in accordance with the correction quantity.

5. The method according to claim 1, further comprising the steps of:
causing the at least one sensor to preprocess the sensor information; and
adapting the allowance to correspond to a time necessary for preprocessing the sensor information.

6. The method according to claim 1, further comprising the step of:
at least one of predefining and adapting the allowance in a variable manner as a function of a performance quantity stemming from the operational sequence.

7. The method according to claim 6, wherein:
the allowance is at least one of predefined and adapted as a function of an engine speed.

8. The method according to claim 1, further comprising the step of:
at least one of predefining and adapting the allowance as a function of at least one of the following:
a transmission time from a processing unit of the at least one control unit to the second connection unit,
a transmission time of a bus message already to be transmitted,
a transmission time of at least one of a first quantity for ascertaining the one of the specifiable synchronization points to the at least one control unit and of a correction quantity via the bus system,
a transmission time from the first connection unit of the at least one sensor to a processing unit of the at least one sensor,
a processing time until an end of a processing of the sensor information by the processing unit in the at least one sensor, and
a transmission time of the sensor information from the at least one sensor to the at least one control unit.

9. The method according to claim 1, further comprising at least one of the steps of:
one of determining the allowance in the form of a time quantity as a time allowance and determining the allowance in the form of an angle quantity as an angle allowance; and
one of converting the time allowance into the angle allowance and converting the angle allowance into the time allowance.

10. The method according to claim 1, wherein:
a transmission between the at least one sensor and the at least one control unit occurs in a line-less manner between the first connection unit and the second connection unit, and
each one of the first connection unit and the second connection unit includes a transmitter/ receiver unit.

11. A device for controlling an operational sequence, in which at least one sensor includes a first connection unit that is connected via a bus system to at least one control unit for controlling the operational sequence, the at least one control unit including a second connection unit, sensor information being transmitted to the at least one control unit, and the at least one control unit at least one of reading in and processing the sensor information at specifiable synchronization points, the device comprising:
in each one of the at least one control unit and the at least one sensor, a respective synchronization element for ascertaining the specifiable synchronization points independently of one another in the at least one control unit and in the at least one sensor in such a way with an allowance that the sensor information is available at the one of the specifiable synchronization points for the at least one control unit in a manner that the sensor information is able to be at least one of read in and processed.

12. The device according to claim 11, wherein:
the operational sequence is controlled in a vehicle.

13. The device according to claim 11, wherein:
each synchronization element includes an angle clock that includes:
an electronic counter,
a counting circuit connected in series to the counting circuit, and
a frequency divider connected in series to the counting circuit.

14. The device according to claim 11, wherein:
each one of the first connection unit and the second connection unit includes a transmitter/receiver unit, and
a transmission is performed in a line-less manner.

15. The device according to claim 11, wherein:
each one of the first connection unit and the second connection unit includes a transmitter/receiver unit, and
a transmission is performed in a line-less manner via a radio bus system.

16. The device according to claim 11, wherein:
the device is used within a framework of an exhaust branch of a vehicle, the at least one sensor corresponding to one of a lambda sensor and a hot-film air-mass meter, and the at least one control unit including an engine control unit.

* * * * *